United States Patent Office 2,763,661
Patented Sept. 18, 1956

2,763,661
PROCESS FOR PREPARATION OF 3-SUBSTITUTED-1,2,4-TRIAZOLES

Christoph J. Grundmann and Alfred Kreutzberger, Columbus, Ohio, assignors to Olin Mathieson Chemical Corporation, a corporation of Virginia No Drawing. Application March 22, 1955,
Serial No. 496,062

7 Claims. (Cl. 260—308)

This invention relates to a novel method of preparing certain 3-substituted-1, 2, 4-triazoles by the reaction of 1, 3, 5-triazine (s-triazine) with the appropriate hydrazine derivative.

More particularly, this invention relates to a method for the preparation of 3-hydroxy, mercapto- or amino-1, 2, 4-triazoles by reaction of s-triazine with semicarbazide, thiosemicarbazide or aminoguanidine, respectively. The reaction of the present method can be written as follows, using the enolic form of the hydrazine derivative:

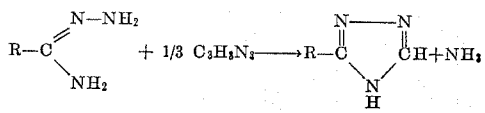

in which R is a hydroxyl, mercapto or amino group.

The reaction is usually carried out in the absence of a solvent by heating the reactants at temperatures of about 100 to 200° C. The reactants are used in substantially stoichiometric proportions according to the above equation. Excess of one reactant or the other can be used but appears to be of no particular advantage.

These 3-substituted 1, 2, 4-triazoles are known compounds useful as pharmaceuticals and agricultural chemicals and also as intermediates in synthesis of dye stuffs, resins and rubber chemicals. For example, one use of 3-amino-1, 2, 4-triazole as a plant growth regulant is described in U. S. Patent 2,670,282. The disulfide can be prepared from 3-mercapto-1, 2, 4-triazole by treatment with hydrogen peroxide. Treatment of an alkaline aqueous solution of 3-hydroxy-1,2,4-triazole with p-diazobenzene-sulfonic acid yields a red dye as described by Manchot in Ber., 31, 2447 (1898).

EXAMPLE I
3-hydroxy-1, 2, 4-triazole

A vigorous reaction with evolution of ammonia occurred when a mixture of 2.9 grams (0.036 mole) of s-triazine and 8 grams (0.107 mole) of semicarbazide in a round-bottomed flask was immersed in an oil bath preheated to 100° C. After the vigorous reaction had ceased, the contents were heated for 5 minutes at 120° C. and then allowed to cool. A yellowish resin resulted which was extracted with ethanol. The ethanolic extract was decolorized with charcoal and evaporated to dryness. The almost colorless residue amounted to 1.7 grams or a yield of 18.7 per cent. Recrystallized from ethanol, the 3-hydroxy-1, 2, 4-triazole melted at 234–235° C. No depression in melting point occurred when mixed with an authentic sample.

EXAMPLE II
3-mercapto-1, 2, 4-triazole

A 100 milliliter round-bottomed flask containing a mixture of 3 grams (0.037 mole) of s-triazine and 10 grams (0.11 mole) of thiosemicarbazide (mole ratio 1:3) was immersed in an oil bath preheated to 190° C. Immediately sintering occurred, followed by a violent reaction with evolution of much ammonia. When the vigorous foaming of the mass ceased, the mixture was heated for 0.5 hour at 190–195° C. to complete the reaction. On cooling, a dark resin resulted which was dissolved in water, boiled with charcoal and filtered. The nearly colorless filtrate, when evaporated to dryness, yielded a yellow substance which, after drying on a porous plate, proved to be 3-mercapto-1, 2, 4-triazole. The yield was 7.1 grams or 63.4 per cent of theoretical. After three recrystallizations from half its weight of boiling water, it melted at 215–216° C. A mixed melting point with an authentic sample prepared as described in the literature gave no depression. The identity of this product was further established by its previously reported reactions, e. g. evolution of $SO_2$ on treatment with concentrated sulfuric acid and conversion with $H_2O_2$ into the corresponding disulfide, the latter having a melting point of 221–222° C.

EXAMPLE III
3-amino-1, 2, 4-triazole

Free aminoguanidine was prepared from the sulfate in aqueous solution by adding an equivalent amount of barium hydroxide. The filtered solution was evaporated to dryness in vacuo. Since the free base is unstable, it was used immediately after preparation for the reaction. A mixture of 6.5 grams (0.088 mole) of aminoguanidine and 2.4 grams (0.0297 mole) of s-triazine (mole ratio 3:1) in a round-bottomed flask was immersed into an oil bath preheated to 210° C. Reaction occurred immediately with evolution of ammonia. The mixture was kept for 5 minutes at a temperature of 210° C. and then cooled. The resulting brown viscous resin was dissolved in absolute alcohol, decolorized with charcoal, and the solvent evaporated. Crude 3-amino-1, 2, 4-triazole remained as a yellowish powder. The yield was 3.5 grams or 47.4 per cent of theoretical. After recrystallization from ethyl acetate, the compound melted at 158–159° C. It was further identified by a mixed melting point with an authentic sample prepared as described in the literature. There was no depression of the melting point.

We claim:
1. A process for preparing 3-substituted-1, 2, 4-triazoles which comprises admixing and heating 1, 3, 5-triazine and a material selected from the group consisting of semicarbazide, thiosemicarbazide and aminoguanidine.
2. A process for preparing 3-hydroxy-1, 2, 4-triazole which comprises admixing and heating 1, 3, 5-triazine and semicarbazide.
3. The process of claim 2 in which the reaction is carried out at a temperature between about 100 to 200° C. and the molar proportion of 1, 3, 5-triazine to semicarbazide is about 1 to 3.
4. A process for preparing 3-mercapto-1, 2, 4-triazole which comprises admixing and heating 1, 3, 5-triazine and thiosemicarbazide.
5. The process of claim 4 in which the reaction is carried out at a temperature between about 100 to 200° C. and the molar proportion of 1, 3, 5-triazine to thiosemicarbazide is about 1 to 3.
6. A process for preparing 3-amino-1, 2, 4-triazole which comprises admixing and heating 1, 3, 5-triazine and aminoguanidine.
7. The process of claim 6 in which the reaction is carried out at a temperature between about 100 to 200° C. and the molar proportion of 1, 3, 5-triazine to aminoguanidine is about 1 to 3.

No references cited.